(12) United States Patent
Fonnum et al.

(10) Patent No.: US 9,738,745 B2
(45) Date of Patent: Aug. 22, 2017

(54) PARTICLES CONTAINING MULTI-BLOCK POLYMERS

(75) Inventors: Geir Fonnum, Fjellhamar (NO); Lise Liljeroth, Oslo (NO)

(73) Assignee: Life Technologies AS, Oslo (NO)

(*) Notice: Subject to any disclaimer, the term of this patent is extended or adjusted under 35 U.S.C. 154(b) by 976 days.

(21) Appl. No.: 11/772,028

(22) Filed: Jun. 29, 2007

(65) Prior Publication Data

US 2008/0139399 A1  Jun. 12, 2008

Related U.S. Application Data

(60) Provisional application No. 60/806,138, filed on Jun. 29, 2006.

(51) Int. Cl.
| | | |
|---|---|---|
| *C40B 30/04* | (2006.01) | |
| *C40B 40/14* | (2006.01) | |
| *C08F 293/00* | (2006.01) | |
| *C08F 287/00* | (2006.01) | |
| *C08L 53/00* | (2006.01) | |
| *C09D 153/00* | (2006.01) | |

(52) U.S. Cl.
CPC .......... *C08F 293/00* (2013.01); *C08F 287/00* (2013.01); *C08L 53/005* (2013.01); *C09D 153/005* (2013.01)

(58) Field of Classification Search
CPC .................................................. C40B 30/04
USPC ....................................................... 506/7, 9
See application file for complete search history.

(56) References Cited

U.S. PATENT DOCUMENTS

| | | | |
|---|---|---|---|
| 4,654,267 A | 3/1987 | Ugelstad et al. | |
| 5,484,681 A | 1/1996 | Cunningham et al. | |
| 5,858,534 A * | 1/1999 | Sucholeiki | G01N 33/5434 428/407 |
| 5,883,176 A | 3/1999 | Gerroir et al. | |
| 5,973,124 A | 10/1999 | Bayer et al. | |
| 6,797,782 B2 * | 9/2004 | Ozaki et al. | 525/244 |
| 6,964,872 B2 * | 11/2005 | Sakurai et al. | 436/518 |
| 7,129,293 B2 * | 10/2006 | Kataoka et al. | 525/69 |
| 7,163,998 B2 | 1/2007 | Leon et al. | |
| 7,192,780 B2 * | 3/2007 | Liu et al. | 436/94 |
| 7,947,368 B2 * | 5/2011 | Song | 428/402 |
| 2003/0198810 A1 | 10/2003 | Wang et al. | |
| 2005/0014001 A1 * | 1/2005 | Fonnum et al. | 428/403 |
| 2005/0054815 A1 | 3/2005 | Leon et al. | |
| 2008/0139399 A1 | 6/2008 | Fonnum et al. | |

FOREIGN PATENT DOCUMENTS

| | | | |
|---|---|---|---|
| DE | 19607481 | 9/1997 | |
| EP | 0430371 A2 | 6/1991 | |
| FR | 2841251 | 12/2003 | |
| JP | 59189113 | 10/1984 | |
| JP | H08254534 | 10/1996 | |
| JP | H10512617 | 12/1998 | |
| JP | 2004317421 | 11/2004 | |
| JP | 2004534879 | 11/2004 | |
| JP | 2008151761 | 7/2008 | |
| WO | WO 9734150 A1 * | 9/1997 | G01N 33/558 |
| WO | WO-9912577 A1 | 3/1999 | |
| WO | WO-00/61647 | 10/2000 | |
| WO | WO2005/010529 | 2/2005 | |
| WO | WO-2005/015216 | 2/2005 | |
| WO | WO 2005021612 A1 * | 3/2005 | C08F 220/28 |
| WO | WO2005/075997 | 8/2005 | |
| WO | WO-2008003099 A1 | 1/2008 | |

OTHER PUBLICATIONS

Gomm et al., Analytical Biochemistry, 226:91-99 (1995).*
Prescher et al., Chemistry in Living Systems, Nature Chemical Biology, 2005, 1(1), 13-21.*
Currie et al., Advances in Colloid and Interface Science, 2003, 100-102, 205-265.*
Chenu et al., Fundamentals of Soil Particle-Microorganism Interactions, Interactions Between Soil Particles and Microorganisms, P.M. Huang Ed., 2002, 4-11.*
Pack et al., Design and Development of Polymer for Gene Delivery, Nature Review, Drug Discovery, 2005, 4, 581-593.*
EP: EP07812526.7, Extended European Search Report mailed Jun. 10, 2009.
EP: EP07812526.7, Examination Report mailed Oct. 13, 2009.
EP: EP07812526.7, Response to Office Action dated Oct. 13, 2009, Filed on Apr. 23, 2010.
EP DIV: EP10153801.5, Extended European Search Report mailed Aug. 20, 2010.
U.S. Appl. No. 11/772,028, Office Action mailed Mar. 17, 2010.
U.S. Appl. No. 11/772,028, Final Office Action mailed Oct. 28, 2010.
CN: 200780032263.9, Office Action mailed Dec. 24, 2010.
JP: 2009-518597; Written Amendment filed Jun. 28, 2009.
PCT: PCT/US2007/072604, International Search Report and Written Opinion mailed Nov. 21, 2007.
PCT: PCT/US2007/072604, International Preliminary Report on Patentability mailed Jan. 15, 2009.
PCT: PCT/US2007/072602; International Search Report & Written Opinion mailed Feb. 21, 2008.
Ansell, R. J., et al., "Magnetic molecularly imprinted polymer beads for drug radioligand binding assay", *Analyst* (Cambridge, United Kingdom), vol. 123, No. 7, 1998, 1611-1616.
Barnard, R., et al., "Serum and liver cytosolic growth-hormone-proteins are antigenetically identical with liver membrane 'receptor' types 1 and 2", *Biochemistry Journal*, vol. 237, No. 3 1986 , 885-892.
Brittan, et al., "Synthesis of Polystyrene-block-poly(methyl methacrylate) Brushes by Reverse Atom Transfer Radical Polymerization", *Macromolecules*, vol. 33, 2000, 1492-3.
Chiefari, J., et al., "Living Free-radical Polymerization by Reversible Addition-Fragmentation Chain Transfer: The RAFT Process", Macromolecules, vol.31,1998, 5559-5562.
Conway, V. L., et al., "Morphology and porosity of poly(vinylbenzyl chloride) beads containing stryene-ethylene, butylene-styrene triblock copolymer", *Sensors and Actuators, B:Chemical*, vol. B45, No. 1, 1997, 11-17.

(Continued)

*Primary Examiner* — Amy M Bunker

(57) ABSTRACT

Polymer particles having a multi-block vinylic polymer attached to their surface are disclosed. The particles can be used in a variety of purification and detection methods.

15 Claims, 8 Drawing Sheets

(56) References Cited

OTHER PUBLICATIONS

Gomm, J.J., et al., "Isolation of Pure Populations of Epithelial and Myoepithelial Cells from the Normal Human Mammary Gland Using Immunomagnetic Separation with Dynabeads" *Analytical Biochemistry*, vol. 226, 1995, 91-99.

Green, N. M., "Avidin and Streptavidin", *Methods of Enzymology*, vol. 184, 1990, 51-67.

Herington, A. C., et al., "Affinity purification and structural characterization of a specific hormone in human serum", *Biochem. and Biophys Rsch. Comms*, vol. 139, No. 1, Aug. 29, 1986, 150-155.

Herington, A. C., et al., "Partical purification from human serum of a specific binding protein for human growth hormone", *Molecular and Cellular End.*, vol. 53, No. 3, 1987, 203-209.

Hughes, James P., et al., "Isolation of growth hormone receptor", *Chem. of Human Growth Hormone*, Ed. R. Salvatore, 1986, 455-461.

Leung, David W., et al., "Growth hormone receptor and serum binding protein: purification, cloning and expression", *Nature*, vol. 330, No. 6148, 1987, 10-16.

Matyjaszewski, K., "Comparison and Classification of Controlled/Living Radical Polymerizations", *American Chemical Society, Symposium Series*, vol. 768, 2000, 20-24.

Moad, G., et al., "A Product Study of the Nitroxide Inhibited Thermal Polymerization of Syrene", *Polymer Bulletin*, 1982, 589-593.

Monge, Sophie, "Synthesis of precursors of poly (acryl amides) by copper mediated living radical polymerization in DMSO", *European Polymer Journal*, vol. 40, No. 1, 2004, 37-45.

Pyun, et al., "Synthesis of Nanocomposite Organic/Inorganic Hybrid Materials Using ControlledΛ"Living\" Radical Polymerization", *Macromol. Rapid Commun.*, vol. 24. 2003, 1043-1059.

Spencer, S. A., et al., "Rabbit liver growth hormone receptor and serum binding protein", *Journal of Biological Chemistry*, vol. 263, No. 16, Jun. 5, 1988, 7862-7867.

Waters, M. J. et al., "Purification and partial characterization of a nonprimate growth hormone receptor", *Journal of Biological Chemistry*, vol. 254, No. 14, Jul. 25, 1979, 6815-6825.

* cited by examiner a. Covalent binding
b. Polymer block, spacer
c. Polymer block with functionality
d. Particle random attached to polymer chain a. Covalent binding
b. Polymer block, spacer
c. Polymer block with functionality
d. Particle random attached to polymer chain

PARTICLES CONTAINING MULTI-BLOCK POLYMERS

CROSS REFERENCE TO RELATED APPLICATIONS

The present application claims priority to U.S. Provisional Patent Application Ser. No. 60/806,138 filed Jun. 29, 2006, the contents of which are incorporated herein by reference.

FIELD OF THE INVENTION

Multi-block vinylic polymer functionalized solid supports, such as polymer microparticles, which are suitable for use in in vitro diagnostic assays are disclosed. In particular, magnetic polymer particles carrying multi-block vinylic polymers which provide a spacer between a binding partner and the polymer particle surface are presented.

DESCRIPTION OF RELATED ART

Polymer particles are of general utility in various medical and biochemical fields, for example as transport vehicles for the delivery of pharmaceutical products, for diagnostic purposes, for separation and for synthetic purposes. These particles are however, of particular utility in diagnostic assays and their use is widespread and well known.

Polymer particles for use in diagnostic assays or for use as transport vehicles and the like need to possess certain properties to be of utility. Thus, they ideally show minimal non-specific binding to ensure that it is essentially only the desired target which becomes bound to the particle, e.g. during an assay. In addition, low particle aggregation is also highly desired. Flocculation or agglomeration of particles is preferably avoided in a successful assay or transport procedure. Moreover, it is also highly desirable that the polymer particle enables binding of a target material with as strong an interaction as possible.

Polymer particles for diagnostic assays carry a binding partner which targets a particular material of interest in the assay procedure. Polymer particles for use in transport and separation are also bound to biomolecules. These are normally bound to the particle surface after the polymer particles are formed. It is believed, however, that where the binding partner which targets a desired material, is bound too close to the surface of the support, steric considerations come into to play and may cause, for example, limitations to binding partner: target binding strength. It is known therefore for binding partners to be spaced apart from the surface of a support using a spacer arm. This is currently effected using polyethylene glycol based spacer arms or simply using a carbon chain.

Various solid supports have previously been coated with multi-block vinylic polymers, primarily however, in the field of polymer brushes where the solid support is silica. For example, in Macromolecules 2000, 33, 1492-3, Brittan et al report the formation of a polystyrene block/poly(methyl methacrylate) block copolymer brushes on a silicate substrate. These polymer brushes therefore allow the grafted polymer to dangle into a solvent with one end attached to a non-soluble surface.

In Macromol. Rapid Commun. 2003, 24, 1043-1059, Pyun et al report the formation of polymer brushes using atom transfer radical polymerization on nanoparticulate supports. Such supports include flat surfaces and nanoparticles. The very high density of the pendant block copolymer chains however, makes these structures suitable only for very particular end uses. Thus, whilst much research has therefore been spent preparing polymer brushes, the application of these materials is in the materials science field, e.g. as protective coatings and the like. These materials are not suitable for use in diagnostic assay procedures.

These polymer brushes are typically prepared using atom transfer radical polymerization (ATRP). More recently however, certain commentators have suggested that atom transfer radical polymerization might be used to form non supported polymers with biomedical applications (see European Polym Journal 40, 2004, 37-45) and that ATRP polymer coated magnetic nanoparticles might have applications in a variety of fields from ferrofluids, NMR, biological separation and mineral separation.

Thus, despite efforts made to date, there exists a need for improved binding partners for use in biological assays.

SUMMARY OF THE INVENTION

Polymer particles having multi-block vinylic polymers attached to their surface are disclosed. The particles can have 2, 3, 4, or more block polymers attached, and optionally at least one binding partner. The binding partner facilitates use of the polymer particles in various purification and detection methods.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

Figure 1:
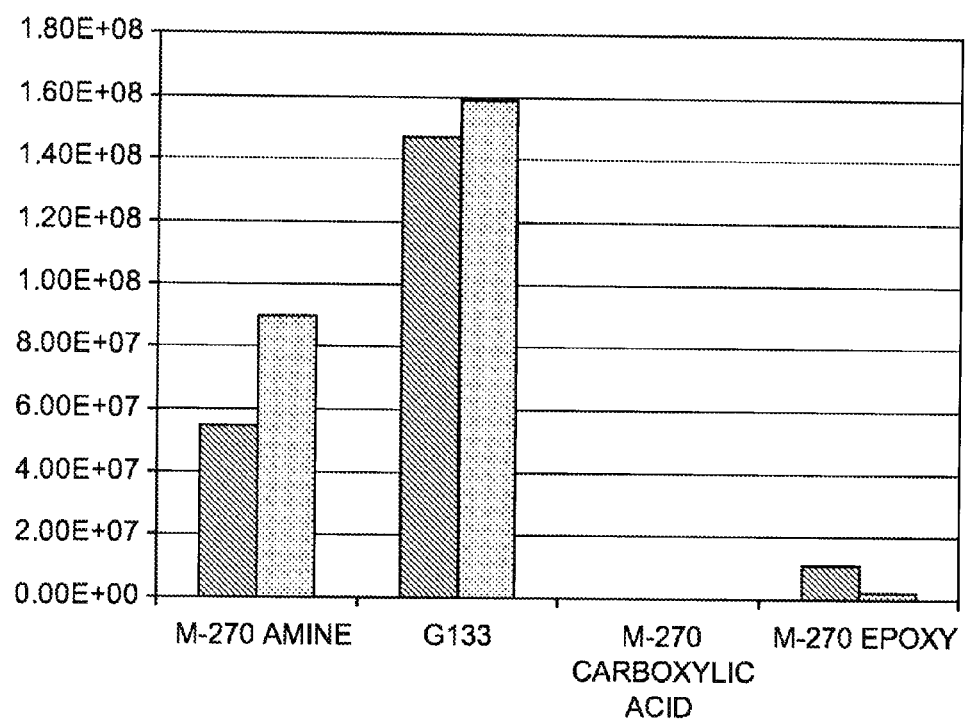
FIG. 1 shows the affinity constant using a competitive assay with antibody from particles described herein in comparison to three commercial particles which do not contain the multi-block polymer. Results are presented in buffer (diagonal line-filled bars) and in serum (dot-filled bars). A constant amount of labeled antibody and an increasing amount of unlabelled antibody was subjected to the beads in buffer or diluted serum. Based on the Langmuir plot obtained, the concentration of active estradiol on the beads and affinity constant was calculated.
Figure 2:
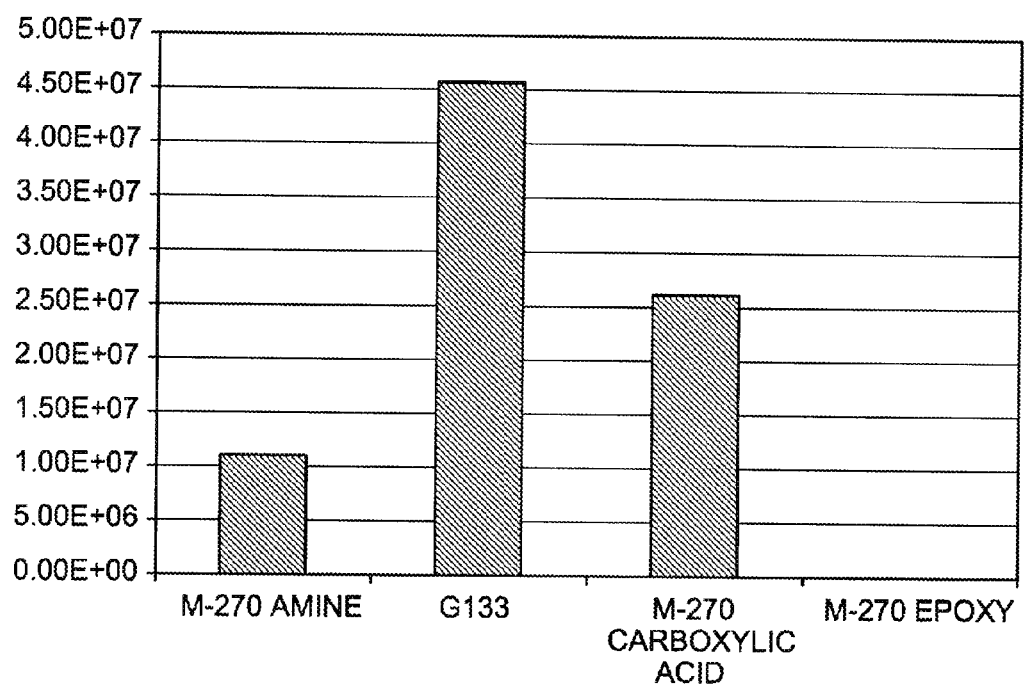
FIG. 2 shows the affinity constant using a competitive assay with estradiol for particles described herein in comparison to three commercial particles which do not contain the multi-block polymer. Results are presented in serum. A constant amount of labeled antibody and an increasing amount of free estradiol antigen was subjected to the beads in diluted serum. Based on the Langmuir plot obtained, the concentration of active estradiol on the beads and affinity constant was calculated.
Figure 3:
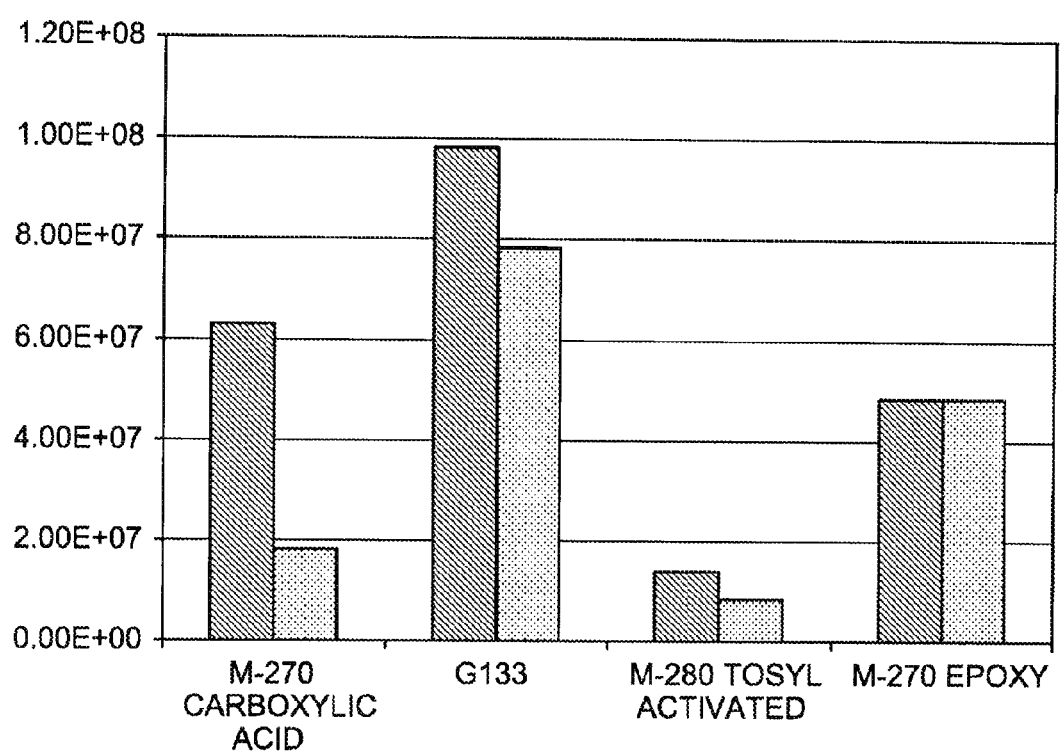
FIG. 3 shows the affinity constant using a competitive assay with antibody from particles described herein in comparison to three commercial particles which do not contain the multi-block polymer. Results are presented in buffer (diagonal line-filled bars) and in serum (dot-filled bars). A constant amount of labeled antibody and an increasing amount of unlabelled antibody was subjected to the beads in buffer or diluted serum. Based on the Langmuir plot obtained, the concentration of active insulin on the beads and affinity constant was calculated.
Figure 4:
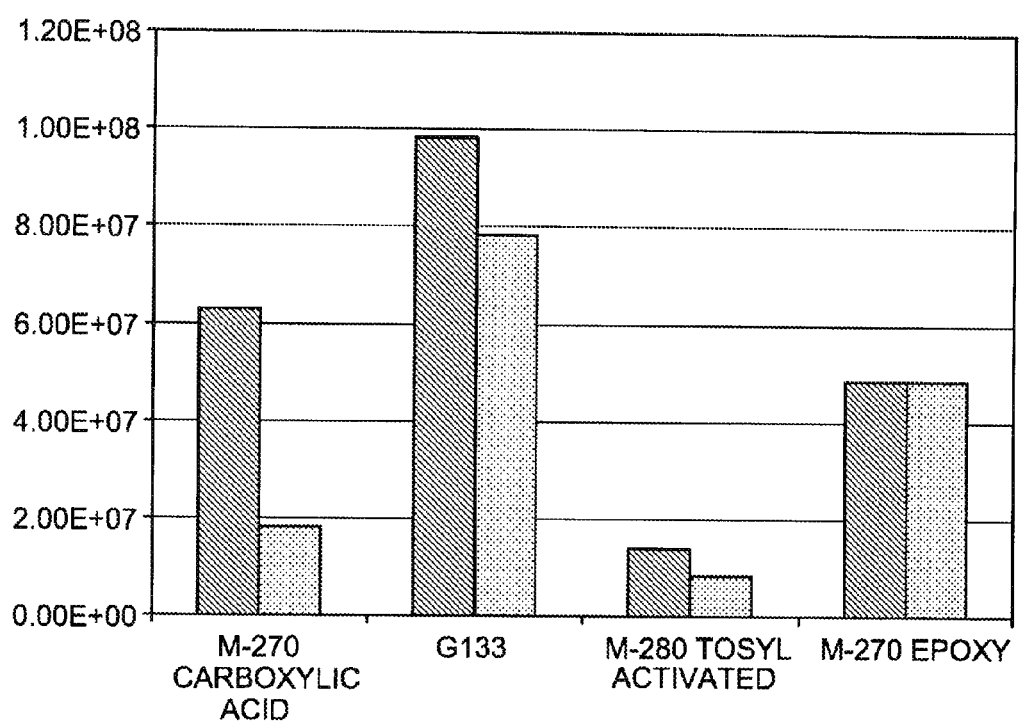
FIG. 4 shows the affinity constant using a competitive assay with insulin for particles described herein in comparison to three commercial particles which do not contain the multi-block polymer. Results are presented in buffer (diagonal line-filled bars) and in serum (dot-filled bars). A constant amount of labeled antibody and an increasing amount of free insulin antigen was subjected to the beads in buffer or diluted serum. Based on the Langmuir plot obtained, the concentration of active estradiol on the beads and affinity constant was calculated.

The present inventors have now surprisingly found that interaction between binding partners (i.e. binding partner and target) can be improved further if the spacer arm employed is formed from a multi-block vinylic polymer, e.g. a block copolymer. Such a modification to the particle has also been surprisingly found to minimize both non-specific binding and prevent aggregation of particles making it valuable for the binding of binding partners in general.

The present inventors have now realized that multi-block vinylic polymers can be grafted onto polymer particles and then used to carry a binding partner for a target of choice, thus providing an ideal particle for use in, for example, a diagnostic assay. As noted above, this reduces non specific binding, reduces agglomeration and improves binding affinity between binding partners. Never before have the benefits of the use of such a polymer in conjunction with a polymer particle been appreciated. Moreover, the use of a multi-block vinylic polymer spacer arm to distance a binding partner from a support surface is believed to be new and forms a further aspect of the invention. The inventors have also devised a particular block structure which provides remarkable improvements in affinity constants and non specific binding which can be used on any support surface.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Thus, viewed from a first aspect, therefore, the present invention provides a polymer particle having a multi-block vinylic polymer attached to the surface thereof.

Viewed from a further aspect the invention provides a solid support, e.g. a polymer particle, having a multi-block vinylic polymer attached to the surface thereof wherein the multi-block polymer is further bound to a binding partner.

Viewed from another aspect the invention provides a solid support, e.g. a polymer particle, having a multi-block polymer, preferably a multi-block vinylic polymer, bound to the surface thereof in which a first block is hydrophilic but uncharged and a second block carries pendant functional groups capable of forming a covalent bond to a binding partner.

Viewed from a still yet further aspect, the invention provides the use of a solid support, e.g. polymer particle, as hereinbefore defined in an assay, e.g. a diagnostic assay, such as an immunoassay or nucleic acid assay or to bind a binding partner.

Viewed from another aspect the invention provides a process for the preparation of a polymer particle having a multi-block vinylic polymer attached to the surface thereof using atom transfer radical polymerization.

Compositions

The solid support of use in the invention can be any solid matrix generally used in biotechnology for immobilization. Such supports could be particles, sheets, membranes, gels, filters, microtiter strips, tubes or plates. Specific supports of interest include silica, glass, inorganic supports such as metal nanoparticles or alumina, organic supports such as polymeric supports (e.g. polystyrene). Preferably, the solid support is a polymer particle, especially a polymer microparticle.

The diameter of a particle may range from 50 nm to 1000 µm, e.g. 100 nm to 100 µm. Preferably however the particle is a microparticle.

By microparticle is meant a particle having a diameter substantially in the micrometer range (i.e. $10^{-6}$ m). Thus, polymer microparticles according to the invention will generally have sizes (i.e. diameters) that are generally in the micrometer range, e.g. about 0.1 µm to about 500 µm, especially about 0.2 µm to about 50 µm, more especially about 0.5 µm to about 8 µm, e.g. about 0.8 µm to about 5 µm. Specific examples of diameters include about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 2 µm, about 3 µm, about 4 µm, about 5 µm, and ranges between any two of these values.

The particles of the invention are preferably polymer particles, i.e. they are formed by monomer polymerization. Particles are preferably made from combinations of vinylic polymers (e.g. styrene), acrylates and/or methacrylates. The polymeric material may optionally be crosslinked, for example by incorporation of cross-linking agents, for example as comonomers, e.g. divinylbenzene (DVB) or ethyleneglycol dimethacrylate. Appropriate quantities of the cross-linking agents (e.g. comonomers) required will be well known to the skilled man. Preferably the polymer is a cross-linked styrenic polymer (e.g. a styrene-divinylbenzene polymer, surface functionalized by the use of a nitro-group containing comonomer, e.g. nitro-styrene, and subsequent reduction) or a cross-linked (meth)acrylic polymer surface functionalized by the use of an epoxy-group containing comonomer (e.g. glycidylmethacrylate) and subsequent amination (e.g. by reaction with ethylene diamine). The polymer particles used are preferably as described in U.S. Pat. No. 4,654,267 (issued Mar. 31, 1987).

It is preferred that the polymer particles are porous. Typically a porous particle used will have a surface area of at least 15 m²/g (measured by the BET nitrogen absorption method), and more preferably at least 30 m²/g, e.g. up to 700 m²/g, when corrected to a mean particle diameter of 2.7 µm (i.e. multiply surface area by 2.7/MD, where MD is the mean diameter in micrometers). Similarly scaled, the particle pore volume is preferably at least 0.1 mL/g.

It is also preferred therefore that the polymer particles are magnetic. By magnetic is meant herein that the polymer particles contain superparamagnetic crystals. Thus the magnetic polymer particles are magnetically displaceable but are not permanently magnetizable. Many processes for preparing magnetic polymer particles are known, a large number of which involve preparing maghemite- or magnetite-containing polymer particles from pre-formed magnetic iron oxides, e.g. magnetite. Some of processes involved are described in U.S. Pat. No. 4,654,267 (issued Mar. 31, 1987).

The polymer particles of the invention are preferably magnetic. By magnetic is meant herein that the polymeric particles are capable of being attracted by a magnetic field. The polymeric particles of the present invention preferably comprise paramagnetic, non superparamagnetic or superparamagnetic crystals. Paramagnetic particles will exhibit slight magnetic remanent properties. Non-superparamagnetic crystals are remanent in the sense that, upon exposure to a magnetic field, the material must have residual magnetization in the absence of a magnetic field. The superparamagnetic polymeric particles are magnetically displaceable but are not permanently magnetizable. This means that after exposure to a magnet the particles may still be suspended or dispersed in solution without aggregation or clumping. The superparamagnetic crystals may be of any material capable of being deposited in superparamagnetic crystalline form in and/or on the polymeric particles. Magnetic iron oxides, e.g. magnetite or maghemite are preferred; however the crystals may be of mixed metal oxides or other magnetic material if desired. The superparamagnetic crystals are typically 5-15 nm in diameter, e.g. about 7 nm while the non-superparamagnetic (thermally blocked) iron oxide crystals are typically somewhat larger.

Such particles rely upon their magnetic properties in order to perform their functions. In diagnostic assay applications, for example, application of a magnetic field to a sample containing an analyte bound to magnetic polymer particles allows the isolation of the analyte without the use of centrifugation or filtration.

The incorporation of magnetic particles in the polymer particles is well known and will be readily carried out by the skilled man. In particular, this can be achieved using a porous polymer particle as described above. In a highly preferred embodiment therefore the polymer microparticle is both magnetic and porous. In a most highly preferred embodiment, the polymer particle is a porous, magnetic polymer microparticle.

The superparamagnetic crystals in the polymer microparticles used in the process of the invention may be of any material capable of being deposited in superparamagnetic crystalline form in the porous polymer particles. Magnetic iron oxides, e.g. magnetite or maghemite are preferred; however the crystals may be of mixed metal oxides or other magnetic material if desired. The total quantity of crystalline magnetic material present is generally more than 1%, preferably more than 3%, desirably more than or equal to 5% (by weight, e.g. up to 60% wt. The percentage is calculated on a Fe (or equivalent metal in the case of magnetic materials other than iron oxides) weight basis based upon the overall dry weight of the particles.

The leaching of superparamagnetic crystals from the porous polymer particles may be inhibited by forming a polymer coating over the superparamagnetic crystal loaded polymer particles, or more particularly by at least partly filling the pores of the particles with a polymer coating. Such coating polymers may typically be formed from monomers reactive with functional groups pendant from the surface of the polymer of the underlying particles.

Coating the polymer particles also provides the surface of the polymer particles with functional groups which can be used to bind other molecules of interest. In the present application, this provides functionalities which can allow the formation of the multi-block polymer. The support may be functionalized to carry any known surface structure such as carboxyl groups, tosyl groups, amino groups, epoxy groups, maleamido groups, thiol groups etc. Methods of doing this are well known in the art.

Functionalization may take place after particle formation by, for example, nitration and subsequent reduction of the thus-formed nitro groups to pendant amine groups; or direct amination, for example by treatment with amino ethanol. As further alternatives, polymeric particles prepared by the well-known Ugelstad two-step swelling process and the improvements thereto disclosed in WO 00/61647 (published Oct. 19, 2000) may be used. Porous polymer particles produced according to the processes described in this publication may have magnetic particles deposited in their pores by standard techniques.

Also WO 05/015216 (published Feb. 17, 2005) describes methods of forming a polyurethane type coating or an epoxide based coating on a particle all of which could be appropriate functional groups on the surface of a polymer particle of use in this invention. Introduction of vinyl groups can also be achieved by reacting the coating surface with a compound such as methacrylic anhydride. For example, a coated particle comprising a coating formed from the reaction of two epoxides which is washed (e.g. in NaOH) to expose hydroxyl functionalities would react readily with methyl acrylic anhydride to allow the introduction of vinyl groups to the polymer surface.

Typically, the polymer microparticles are spherical and substantially monodisperse before they are coated and especially preferably remain spherical and substantially monodisperse once they have been coated.

By substantially monodisperse it is meant that for a plurality of particles (e.g. at least 100, more preferably at least 1000) the particles have a coefficient of variation (CV) of less than 20%, for example less than 15%, preferably less than 12%, more preferably less than 11%, still more preferably less than 10% and most preferably no more than about 8%, e.g. 2 to 5%. CV is determined in percentage as: CV=(100×standard deviation)/mean. "Mean" is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90% of total particle number (of detectable particles that is). Such a determination of CV is performable on a Coulter LS 130 particle size analyzer.

Particles meeting these requirements and having a desirable coating are available commercially from suppliers such as Invitrogen (Dynal). The superparamagnetic polymer beads sold under the trade names Dynabeads are especially preferred. Dynabeads are particularly advantageous since they remain in suspension and do not exhibit magnetic particle sedimentation often associated with other magnetic beads. Dynabeads also show excellent magnetic mobility compared to other magnetic particles in which high levels of iron are present. Dynabeads exhibit beneficial kinetics allowing shorter reaction times and higher throughputs. Their unspecified binding is lower than other magnetic beads and their proper use results in a concentration of the desired material taking place resulting in easier and more efficient washing procedures. Finally Dynabeads are easy to automate and are monodisperse.

Specific Dynabeads of use in this invention include Dynabeads MyOne, Dynabeads M-270, M-280 or M-450 which can be purchased aminated, tosyl activated or carboxylic acid activated as desired.

The solid support, preferably a polymer particle, carries a multi-block polymer, preferably a multi-block vinylic polymer bound to its surface. Since the multi-block polymer is bound to the surface of the support, e.g. the surface of the polymer microparticle, it is distinguished from any block polymer which may be used in the manufacture of the support (e.g. polymer particle) itself or the coating thereof. Polymer particles are often coated, e.g. to prevent leaching of magnetic particles and to provide a functionalized surface, but the multi-block polymer which is attached to the surface of the support is not to be considered a coating polymer. The multi-block polymer is therefore bound to the polymer particle surface after the particle and, if present, the coating, are formed and is not therefore one which forms during polymer particle manufacture or coating thereof.

The invention requires that a solid support, e.g. a polymer particle, has at least one multi-block polymer attached to the surface thereof. It will be appreciated however that the support is likely to contain a plurality of such polymers.

By multi-block polymer is meant a polymer formed from at least two different blocks of polymer. By multi-block vinylic polymer is meant a polymer formed from at least two different blocks of polymer which are made through the polymerization of vinyl monomer(s). Thus, in this embodiment, a monomer comprises a vinyl bond (C=C), so blocks are not made from a repeating unit such an —OCH$_2$CH$_2$—.

A block of polymer is one formed from the combination of at least 3 identical repeating units. More preferably, the polymer is formed from the combination of at least 10, and especially at least 20, identical repeating units. Specific examples include 3, 4, 5, 6, 7, 8, 9, 10, 11, 12, 13, 14, 15, 16, 17, 18, 19, and 20 identical repeating units. Thus, a first block might be formed from a number of styrene units and a second block from a number of identical acrylate units.

A multi-block polymer comprises at least 2 different blocks. Thus, the multi-block polymer may comprise two blocks, three blocks, four blocks or more than four blocks. Preferably, the multi-block polymer contains three blocks or two blocks, especially two blocks. Such a polymer is typically called a diblock polymer or block copolymer.

Any suitable monomer can be used to from a polymer block, in particular one with a vinylic group or one based on an ethylene glycol repeating unit. Suitable vinylic monomers include an alkene (ethylene), vinylaryl compound (e.g. styrene), acrylate, acrylic acid, acrylamide (such as acrylamide, hydroxymethyl acrylamide, or N-tris(hydroxymethyl) acrylamide), vinyl chloride, tetrafluoroethylene, vinyl azlactone or vinylbenzylchloride.

Most preferably, the monomer is an acrylate such as methacrylate, methyl methacrylate, ethylacrylate, N-hydroxysuccimide methacrylate, tertbutyl acrylate, butylacrylate, ethoxyethylacrylate, ethylhexylacrylate, hydroxyethylacrylate, hydroxymethylacrylate, hydroxypropylacrylate, acrylate with PEG functionality, hydroxymethylacrylate, ethylacrylate, ethyl ether acrylate, ethylene glycol methyl ether acrylate, fluorescein o-acrylate, or 2-hydroxypropyl acrylate. In a highly preferred embodiment, the acrylate used is a methacrylate.

By definition, however, at least two blocks are formed from a different polymer, e.g. a styrene polymer for one block and an acrylate polymer for another block, or two different (meth) acrylate esters, or two different (meth) acrylamides. Embodiments of the invention also include multi-block polymers comprising 3 or more blocks in which two were the same as long as two were also different, e.g. a structure such as block A, block B, block A, block B would be covered.

One monomer can be used to form a polymer and for the polymer to be treated thereafter to form the desired two or more blocks. Thus, an acrylate polymer could be formed that could be partially hydrolyzed to form a block of ester polymer and a block of acid polymer.

Preferably however, two different vinylic monomers are used to form the multi-block polymer of the invention.

The block nearest the surface of the support will be termed the first block. The first block polymer is preferably one which is hydrophilic but is uncharged. By uncharged is meant that the block is free from groups such as amino, phosphate, sulphonic acid or carboxylic acid groups which become readily charged in physiological environments. To be hydrophilic however, the block typically contains functional groups such as hydroxides, thiols, amides, halides and the like which are polar and are therefore hydrophilic. Whilst it is appreciated that these groups can be charged, to do so requires rigorous conditions of acid or base and such groups are therefore typically uncharged. For clarity therefore, by uncharged group is meant one which will not become charged at a pH of between 3 to 12. Ideally, the hydrophilic block polymer would be one which is soluble in water.

Preferably, the first block does not bind to a binding partner. In a further preferred embodiment, the first block is free from side chain functional groups that can react with a binding partner.

Preferably, a block further from the support surface than the first block, preferably furthest from the polymer particle surface (from hereon termed the terminal block) will be one which contains pendant functional groups which are capable of readily bonding to a binding partner. By pendant functional group is meant that the functional group is in a side chain of the polymer rather than part of the backbone of the polymer.

By capable of bonding to a binding partner is meant that the group in the side chain will be one which readily undergoes (or can be readily made to undergo via simple activation), a coupling reaction with a binding partner to covalently bond the binding partner to the block polymer side chain. Groups which are capable of reacting in this way will be well known to the skilled man. It will also be appreciated that more than one active group could be present.

Suitable groups which undergo reaction with binding partners and which can be readily activated for reaction with binding partners include amino, carboxylic acids, activated carboxylic acids (such as succinimidyl esters, esters, acid chlorides), halides, activated hydroxides (e.g. alkoxides, tosylates, brosylates, mesylates and so on), hydroxyls, thiols, activated thiols (i.e. the thio equivalent of the activated hydroxides), carbonates, maleimides and epoxides.

In a preferred embodiment, the pendant functional groups on the terminal block may be charged or will contain functionalities capable of readily carrying charge, e.g. amino, phosphate, sulphonic acid or carboxylic acid groups. Again, the person skilled in the art will appreciate that whether these groups are charged depends on the pH of the system in which they are present, but will also appreciate that charging these groups is trivial. It is stated therefore that by group capable of carrying a charge is meant one which becomes charged at a pH of between 3 to 12.

The hydrophilic/active functional groups in the block copolymer can be introduced after formation thereof but preferably, they are introduced or precursors thereto are introduced during formation of the block polymer. Thus, monomers suitable for use in the preparation of the first block are those listed above. Specifically preferred are methacrylate, (meth)acrylate with PEG functionality, acrylamide, dimethylacrylamide, hydroxymethyl acrylamide, N-tris(hydroxymethyl) acrylamide, vinyl azlactone, buthylacrylate, ethoxyethylacrylate, ethylhexylacrylate, hydroxyethylacrylate, hydroxymethylacrylate, hydroxypropylacrylate, hydroxymethylacrylate, ethylacrylate, di(ethylene glycol) ethyl ether acrylate, ethylene glycol methyl ether acrylate, fluorescein o-acrylate, 2-hydroxypropyl acrylate and acryloxysuccinimide. Preferably, the monomer used to form the first block is an acrylate, especially a methacrylate.

Preferred monomers of use in the formation of the terminal block are those listed above. Specific monomers of interest include vinyl azlactone, styrene-4-carboxylic acid (esters), styrene 4-sulphonic acid, functionalized acrylamides (e.g. an acrylic acid coupled to a diamine or an amino acid), acrylamide or acrylates, e.g. acrylates with activated hydroxyl groups, and aldehydes such as acrylolein.

Preferably, the monomer used to form the first block is an acrylate, especially a methacrylate different from that used to form the first block.

In a further preferred embodiment the first block is an acrylamide block and the terminal block is an acrylic acid block.

It may, of course, be desirable to protect functional groups on monomers during polymerization as is well known in the art. In particular, carboxylic acid groups may be protected, e.g. using esters. Such groups can be deprotected readily however once the polymer is formed, giving rise to the desired charged species if necessary. Alternatively, the ester can be removed using a nucleophile to provide an alternative functionality on the polymer.

It has been surprisingly found that the preferred arrangement of hydrophilic and charged blocks is particularly advantageous as the first block provides high steric stability and the terminal block provides charge stability. Moreover the charge of the block polymer is low compared to one formed purely from charged monomers which reduces nonspecific binding by preventing the block polymer acting like an ion exchange resin. The combination also results in high affinity constants.

Each block preferably has a molecular weight of about 500 Daltons to about 10,000 Daltons, preferably about 1000 Daltons to about 5000 Daltons. It may be made up from, for example, 3 to 150 repeating units, preferably 10 to 50 repeating units.

Preferably, no one block should form less than 5 wt % of the multi-block polymer. Thus, the weight ratio of two blocks (e.g. the first and terminal blocks) may be in the range 1:10 to 10:1, e.g. 1 to 5 to 5:1, especially 1:3 to 3:1.

Methods of Preparation

The formation of the multi-block polymers on the support can be achieved in various ways. A preformed multi-block polymer could be bound onto the support using conventional chemistry. Thus, a polymer could be formed in solution and coupled onto a suitably functionalized solid surface. The block copolymer could be formed on the surface of the particle by conventional free radical chemistry. Preferably however, the polymer is generated on the surface of the support by effecting a surface initiated living polymerization, in particular living radical polymerization, such as stable free radical polymerization (SFRP) such as nitroxide-mediated polymerization (NMP), reversible addition fragmentation chain transfer (RAFT), or atom transfer radical polymerization (ATRP) on the surface thereof. ATRP is especially preferred.

Living polymerizations are characterized by chain growth that matures linearly with time. In order to grow linearly with time, these ionic polymerizations proceed by a chain mechanism in which subsequent monomer molecules add to a single active site. Furthermore, addition occurs without interruption throughout the life of the active site. IUPAC offers a definition of living polymerizations as those which may include slow initiation, reversible formation of species with various activities and lifetimes, reversible formation of inactive species and/or reversible transfer. Living polymerizations do not include irreversible deactivation and irreversible transfer.

In SFRP, alkoxy initiators or nitroxide persistent radicals are used to form polymers such as styrenes and acrylates. A commonly used nitroxide is 2,2,6,6-tetramethylpiperidine 1-oxyl.

RAFT is achieved by performing a free radical polymerization in the presence of dithio compounds which act as efficient reversible addition-fragmentation chain transfer agents. The rapid switching mechanism between dormant and active chain ends affords living polymerization character.

Comprehensive descriptions of these techniques can be found in the literature, e.g. for SFRP see G. Moad, E. Rizzardo, D. H. Solomon, "A product study of the nitroxide inhibited thermal polymerization of styrene", Polym. Bull., 1982, V.6,s.589.e.g. for RAFT see Chiefari. J, Chong. Y. K, Ercole. F, Krstina. J, Jeffery. J, Le. T, Mayadunne. R, Meijs. G. F, Rizzardo. E, Thang. S, "Living Free-radical polymerization by reversible addition-fragmentation chain transfer: the RAFT process", Macromolecules, 1998, 31, 5559-5562.

A general overview of these techniques is also found in Matyjaszewski. K, "Comparison and classification of Controlled/Living Radical Polymerizations", American Chemical Society, Symposium Series 768, 2000, D.C., 20-24.

Thus, viewed from a further aspect the invention provides a process for the preparation of a polymer particle having a multi-block vinylic polymer attached to the surface thereof using living radical polymerization.

In a preferred embodiment, the multi-block polymer is introduced onto the solid support, e.g. polymer particle by atom transfer radical polymerization (ATRP). This form of polymerization is quite new and is characterized by chain growth that matures linearly with time. The process involves the use of a catalytic amount of copper(I) which reversibly abstracts a halide from the polymer chain end thereby affording a switching mechanism between a dormant and an active propagating state. The process has been found to allow the ready formation of a first block and subsequent different blocks simply by changing the nature of the monomer added.

The use of surface initiated polymerization techniques is widely reported in the recent literature and will be readily achieved by the skilled man. Never before however, has anyone appreciated the potential benefits of using such a reaction in combination with a polymer particle, in particular a magnetic polymer particle, to form a functionalized particle with numerous potential uses in diagnostic assays.

To effect ATRP, the support surface needs to carry a halide ion. This is typically carried out by reacting the support with an initiator and the polymer grows outwards therefrom. The initiator is a compound which provides a surface halide ion which can be abstracted by the Cu(I) catalyst. Any suitable initiator can be used and it is also possible to start polymerization from a support, e.g. polymer particle, which already carries a halide surface functionality, e.g. as part of its coating.

Preferred initiators are halosilanes, halobuthrates, sulphonic acid chlorides, halogenated alkyl groups (e.g. chloroform) or bromoacetic acid. A preferred initiator is alpha-bromoisobuthyrate ($BrC(CH_3)_2C(O)Br$).

Once the initiator has been bound to the support surface polymerization can begin by adding the desired first block monomer and a Cu(I) catalyst, typically CuBr. The block polymer grows in a highly controlled manner and once all the first monomer has been used (or once a suitably sized first block has been manufactured and the first monomer removed), a second monomer added, again in the presence of the catalyst.

Thus, viewed from a further aspect the invention provides a process for the preparation of a polymer particle having bound to the surface thereof a multi-block vinylic polymer comprising:

(I) mixing a polymer particle with a halide containing atom transfer radical polymerization initiator;

(II) mixing the product of step (I) with a Cu(I) compound and a first vinylic monomer; and (III) mixing to the product of step (II) a second vinylic monomer.

Alternatively viewed, the invention provides a process for the preparation of a solid support having bound to the surface thereof a multi-block vinylic polymer comprising:

(I) mixing a polymer particle with a halide containing atom transfer radical polymerization initiator;

(II) mixing the product of step (I) with a Cu(I) compound and a first vinylic monomer to form a first block polymer; and (III) mixing to the product of step (II) a second vinylic monomer to form a second (preferably terminal) block polymer; and (IV) coupling a binding partner to the first or preferably second block polymer.

The conditions of an ATRP reaction are well known and are described in the literature. It is very important to eliminate water and it may be beneficial to carry out certain reactions in an inert atmosphere. The actual ATRP can take place at a temperature from 0 to 150° C., e.g. 50 to 100° C. The reaction will typically take place in an inert solvent such as toluene, DMSO, THF or DMF.

The catalyst used is preferably CuBr. Other catalysts can alternatively be used, such as CuI or CuCl.

Once formed, the multi-block polymer can be manipulated using standard chemical techniques. It may be necessary for example, to protect functional groups in a monomer during polymerization. These protecting groups can be removed after the ATRP reaction is complete. Moreover, where a functional group is present in the formed multiblock polymer, it is, of course, possible to react that functional group using conventional chemistry. Thus, where a multi-block polymer carries a carboxylic ester side chain for example, this could be converted to an amide or acid by reaction with an amino compound/hydrolysis as is well known.

This further allows therefore the introduction of specific functional groups onto a multi-block polymer where the desired block polymer is to be formed from, for example, hydrophilic and charged blocks. Thus, a hydroxy group can be introduced on to a block polymer by reaction of an electrophilic functional group such as an ester with ethanolamine. Such a reaction would also introduce an amide. An ester could be deprotected to form an acid and an acid reduced to an aldehyde. A free acid could also be coupled to a standard activator like N-hydroxysuccimide to provide a highly reaction side chain on a block copolymer. Manipulation of the functional groups on the polymers is therefore readily achieved.

Moreover, due to the ATRP reaction, the resulting multi-block polymer normally carries a halide ion at the end of the final block as this is how the polymerization is propagated. The presence of such an electrophilic group allows, of course, easy coupling of multi-block polymer to a binding partner for a target. Nucleophilic binding partners can therefore be coupled directly whilst electrophilic ones can be coupled after conversion of the halide ion to, for example, an amine. Binding partners can of course, also be coupled directly to a side chain functional group on the first or preferably terminal block polymer.

In a further embodiment, the multi-block polymer is made in solution before being grafted on the polymer particle. Synthesis of the multi-block polymer can be carried out in a similar fashion to above using a halide based initiator from which the polymerization begins.

Once formed, the polymer can also be manipulated in solution or on the polymer particle as hereinbefore described to provide hydrophilic or charged blocks etc. Preferably, it is coupled to the particle surface straight after multiblock polymer formation.

Coupling of the formed multi-block polymer to the particle is again easily achieved by the skilled man and may rely, for example, on side chains present on the multi-block polymer which could be coupled to active groups on the particle surface using well known chemistry. Since the reaction of the particle surface with the multi-block polymer takes place at a random unit within the polymer, the result is a pendant multiblock polymer with two tails, bound at some point to the particle surface.

This is a further advantageous feature of the invention as the tails can comprise different functional groups at their ends. This improves coupling efficiencies to binding partners.

In a further aspect of the invention, the solid support carries at least one block polymer (in effect a homopolymer) and at least one random copolymer bound thereto, and optionally a binding partner. By random copolymer is meant that a polymer contains at least 2 randomly alternating repeating units as opposed to a block of identical repeating units. The block polymer and random copolymer are joined, i.e. they are not bound separately to the support rather they form one pendant overall polymer.

Thus viewed from a further aspect the invention provides a solid support, e.g. a polymer particle, having a block vinylic polymer bound to a random copolymer attached to the surface thereof, wherein the block vinylic polymer or random copolymer is optionally further bound to a binding partner. Preferably, the block polymer is the one nearest the support surface and the random copolymer forms in place of the terminal block.

The random copolymer can be formed by free radical polymerization, by living polymerization (e.g. by ATRP) or by grafting a preformed random copolymer onto a solid support or onto a block polymer formed on the support. The living radical polymerization technique, e.g. ATRP technique, described in detail herein, can therefore, also be used with a mixture of monomers to form a random polymer as opposed to a block polymer.

Thus, viewed from a further aspect, the invention provides a process for the preparation of a solid support having bound to the surface thereof a vinylic polymer comprising:

(I) mixing a polymer particle with a halide containing atom transfer radical polymerization initiator;

(II) mixing the product of step (I) with a Cu(I) compound and a first vinylic monomer to form a first block polymer; and (III) mixing to the product of step (II) a second and third vinylic monomer to form a random polymer; and optionally (IV) coupling a binding partner to the formed polymer.

Vinylic monomers used to form the random copolymer are the same as those of use in the formation of the block polymers. It will be appreciated that one of the second/third monomers may be identical to the first monomer. The random copolymer formed will of course differ from the block polymer (i.e. homopolymer) formed in the first stage.

Preferably however, the random copolymer is formed by manipulation of a block polymer, e.g. one formed by ATRP. Thus, a multi-block polymer can be formed using techniques as hereinbefore described and the second block manipulated to form a random polymer.

Thus, if a block polymer is initially an acrylate block polymer carrying many ester side chains, this could be reacted simultaneously with two nucleophiles, e.g. two amino compounds, which would randomly substitute off the acrylate ester groups leaving a random copolymer with varying side chains. An acrylate block polymer could be subjected to partial hydrolysis to form a random polymer having some acid and some ester side chains and so on. The skilled man can devise all manner of ways of manipulating a block polymer such as an acrylate into a random copolymer.

Thus, formed from a further aspect the invention provides a solid support, e.g. a polymer particle, having a polymer attached to the surface thereof, said polymer comprising a block polymer and a random copolymer.

Such a structure can be bound to a binding partner as described in connection with multi-block polymer carrying supports. The binding partner preferably binds to the random polymer section of the structure.

Again, it is preferred if the random copolymer contains side chain functional groups which are capable of reacting with binding partners, especially functional groups that are charged or capable of becoming charged. Such groups have been discussed in detail above and are applicable also to this aspect of the invention.

It will be appreciated that if one block of a multiblock polymer is being manipulated in the fashion above, the other block is, if necessary, protected to prevent any unwanted chemistry occurring.

Each random polymer preferably has a molecular weight of about 500 Daltons to about 10,000 Daltons, preferably about 1000 Daltons to about 5000 Daltons. It may be made up from, for example, 3 to 150 repeating units, preferably 10 to 50 repeating units.

Preferably, no one random polymer should form less than 5 wt % of the multi-block polymer. Thus, the weight ratio of block to random polymer may be in the range 1:10 to 10:1, e.g. 1 to 5 to 5:1, especially 1:3 to 3:1.

The solid support with multi-block polymer can be coupled to any binding partner as is well known in the art. For example, direct coupling could be achieved via reductive amination or via reaction of a nucleophilic group on a binding partner with an activated ester side chain on the block polymer, e.g. an N-hydroxysuccinimide activated ester. Amine groups and carboxylic acid groups on the binding partner/block polymer can be linked through conventional peptide formation chemistry, e.g. using carbodiimides. Thus the binding of these components is readily achieved.

The term "binding partner" is defined as any biological or other organic molecule capable of specific or nonspecific binding or interaction with another biological molecule, which binding or interaction may be referred to as "ligand" binding or interaction and is exemplified by, but not limited to, antibody/antigen, antibody/hapten, enzyme/substrate, enzyme/inhibitor, enzyme/cofactor, binding protein/substrate, carrier protein/substrate, lectin/carbohydrate, receptor/hormone, receptor/effector or repressor/inducer bindings or interactions. The appropriate ligands will be chosen depending on the use to which the supports of the invention is desired to be put. Types of these ligands are listed below. The combination of a solid support, multi block vinylic polymer and binding partner is believed to be new and forms a further aspect of the invention.

The binding partner may therefore be an antibody, amino acid, protein, peptide, polypeptide, enzyme, hormone, lymphokine, metabolite, antigen, hapten, lectin, avidin, streptavidin, biotin, toxin, poison, carbohydrate, oligosaccharide, polysaccharide, glycoprotein, glycolipid, nucleotide, oligonucleotide, nucleic acid or derivatized nucleic acid, DNA, RNA, receptor, virus particle, bacteria, virus component, cell, cellular component, natural lipid vesicle, synthetic lipid vesicle, or polymer membrane.

Methods of Use

The resulting support can then be used in separation or as a transport vehicle. Preferably, the particles of the invention are used in assays, e.g. a competitive assay, and therefore carry a binding partner for a target of interest. The nature of the binding partner coupled to the particles may be selected on the basis of its ability to bind to a particular target material. A large variety of suitable assays are known e.g. immunoassays or nucleic acid detection.

The above-described polymer particles can be used in a variety of purification and detection methods. A method of purifying a target material from a sample can comprise providing a sample containing a target material; providing polymer particles having a multi-block vinylic polymer attached to their surface; contacting the sample and polymer particles under conditions suitable for binding of the target material to the polymer particles; and separating the polymer particles from the sample. The method can further comprise detecting the target material after the separating step. The method can further comprise isolating the target material from the polymer particles after the separation step.

In the most preferred embodiment, the invention provides a magnetic, porous polymer microparticle having a multi-block vinylic polymer comprising a first hydrophilic block and terminal block optionally carrying a binding partner.

The target material chosen may be a particular structural molecule e.g. a peptide, protein, glycoprotein, lipid or carbohydrate etc. associated with the surface of larger biological entities for example cells. Other target materials may be biological substances including peptides, polypeptides, proteins, lipoproteins, glycoproteins, nucleic acids (DNA, RNA, PNA, aptomers) and nucleic acid precursors (nucleosides and nucleotides), polysaccharides, lipids such as lipid vesicles. Typical proteins which are detectable in conventional streptavidin/biotin systems, and useful herein, include cytokines, hormones, vitamins, surface receptors, haptens, antigens, antibodies, enzymes, growth factors, recombinant proteins, toxins, and fragments and combinations thereof. The target material can alternatively be a cell.

The term "cell" is used herein to include all prokaryotic (including archaebacteria and mycoplasmas) and eukaryotic cells (including all types of mammalian and non-mammalian animal cells, plant cells, insect cells, fungal cells, yeast cells, protozoa) and other entities such as viruses and sub-cellular components such as organelles (e.g. mitochondria and nuclei) or protoplasts.

Target materials therefore include antibodies, amino acids, proteins, peptides, polypeptides, enzymes, enzyme substrates, hormones, lymphokines, metabolites, antigens, haptens, lectins, avidin, streptavidin, toxins, poisons, environmental pollutants, carbohydrates, oligosaccharides, polysaccharides, glycoproteins, glycolipids, nucleotides, oligonucleotides, nucleic acids and derivatized nucleic acids, DNA, RNA, natural or synthetic drugs, receptors, virus particles, bacteriophages, cells, cellular components, natural or synthetic lipid vesicles, polymer membranes, and particles and glass and plastic surfaces.

The term "biotinylated substances" or "moieties" is to be understood as conjugates of modified biotin or biotin analogues with other moieties such as biomolecules, e.g. nucleic acid molecules (including single or double stranded DNA, RNA, DNA/RNA chimeric molecules, nucleic acid analogs and any molecule which contains or incorporates a nucleotide sequence, e.g. a peptide nucleic acid (PNA) or any modification thereof), proteins (including glycoproteins, enzymes, peptides library or display products and antibodies or derivatives thereof), peptides, carbohydrates or polysaccharides, lipids, etc., wherein said other moieties are covalently linked to the modified biotin or biotin analogues. Many biotinylated ligands are commercially available or can be prepared by standard methods. Processes for coupling a biomolecule, e.g. a nucleic acid molecule or a protein molecule, to biotin are well known in the art.

The terms "biotin" as used herein are intended to refer to biotin (cis-hexahydro-2oxo-1H-thieno[3,4]imidazole-4-pentanoic acid) and any biotin derivatives and analogs. Such derivatives and analogues are substances which form a complex with the biotin binding pocket of native or modified streptavidin or avidin. Such compounds include, for example, iminobiotin, desthiobiotin and streptavidin affinity peptides, and also include biotin-.epsilon.-N-lysine, biocytin hydrazide, amino or sulfhydryl derivatives of 2-iminobiotin and biotinyl-.epsilon.-aminocaproic acid-N-hydroxysuccinimide ester, sulfosuccinimide-iminobiotin, biotinbromoacetylhydrazide, p-diazobenzoyl biocytin, 3-(N-maleimidopropionyl) biocytin. A preferred derivative of biotin to be used in the present invention is desthiobiotin or its derivative DSB-X Biotin, commercially available from Molecular Probes, Eugene, Oreg., USA) (Prod. No. D20658)

The term "avidin" as used herein refers to the native egg-white glycoprotein avidin as well as derivatives or equivalents thereof, such as deglycosylated or recombinant forms of avidin, for example, N-acyl avidins, e.g., N-acetyl, N-phthalyl and N-succinyl avidin, and the commercial products ExtrAvidin, Neutralite Avidin and CaptAvidin The term "Streptavidin" as used herein refers to bacterial streptavidins produced by selected strains of *Streptomyces*, e.g., *Streptomyces avidinii*, as well as derivatives or equivalents thereof such as recombinant and truncated streptavidin, such as, for example, "core" streptavidin.

Some of Avidin/Streptavidin materials are commercially available, e.g. native avidin and streptavidin, non-glycosylated avidins, N-acyl avidins and truncated streptavidin, or can be prepared by well-known methods (see Avidin-biotin technology, Methods of Enzymology, Vol. 184: 1-671, 1990. In that reference Green, describe preparation of avidin and streptavidin; Hiller et al., the preparation of non-glycosylated avidin; Bayer et al., the preparation of streptavidin and truncated streptavidin, Chandra & Gray describe recombinant avidin). Both native and recombinant forms of streptavidin and avidin may be used in the methods described herein as long as they can be modified as described in U.S. Pat. No. 5,973,124. A preferred derivative of streptavidin to be used in the present invention is Nitro-streptavidin. A preferred derivative to use as starting material is recombinant core-streptavidin.

Other specific affinity adsorbent moieties, such as wheat germ agglutinant, anti-idiotypic antibodies and dye ligands may also be coupled to the modified biotin to isolate glycosylated proteins such as SP1 transcription factor, dye binding proteins such as pyruvate kinase and liver alcohol dehydrogenase, and other antibodies.

Preferred assays are those which detect nucleic acid. Nucleic acid detection generally involves probing a sample thought to contain target nucleic acids using a nucleic acid probe that contains a nucleic acid sequence that specifically recognizes, e.g. hybridizes with, the sequence of the target nucleic acids, such that the nucleic acid binding partner and the target nucleic acids in combination create a hybridization layer. Suitably functionalized supports of the invention, e.g. those coated with streptavidin, are ideally suited for nucleic acid detection.

Biotinylated single strand oligonucleotide probes bound to streptavidin supports can be used to isolate sequence specific DNA. The biotinylated probes are bound to the supports by mixing the appropriate amount of supports with an excess of biotinylated probe. The supports/probe are then incubated with the DNA sample in a hybridization buffer, e.g. SSPE or SSC, under conditions appropriate for the length and sequence of the probe and DNA. The excess and unwanted DNA is washed away utilizing the magnetic properties of the supports. The captured DNA can be detected/quantified by PCR etc.

Biotinylated double strand DNA fragments bound to streptavidin supports can be used to isolate DNA sequence specific binding proteins. The biotinylated DNA is bound to the supports by mixing the appropriate amount of supports with an excess of biotinylated DNA fragments. The supports/DNA are then incubated with the protein sample in a hybridization buffer, under conditions appropriate for the protein under investigation. The excess and unwanted protein is washed away e.g. utilizing the magnetic properties of the support. The captured protein can be eluted from the probe (by high salt, low salt, heat, low pH etc) for downstream applications and detection.

The sample can generally be any sample suspected of containing the target material. Examples of samples include biological fermentation media, suspensions of virus particles, cell lysates, prokaryotic cells, eukaryotic cells, virus particles, tissues, and biological fluids. Suitable biological fluids include urine, cerebrospinal fluid, blood, lymph fluids, interstitial fluid, cell extracts, mucus, saliva, sputum, stool, physiological or cell secretions or other similar fluids.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1: Preparation of Multi-Block Polymer on a Polymer Particle 5 g (Dry Substance weight, DS) Magnetic Beads (Dynabeads® M-270 amine) were washed with THF (5 times, 15 mug DS each time). The DS weight was adjusted to 30% (the volume of the mix of solvent and beads was reduced by removing the supernatant until a 30 wt % beads in solvent mix was achieved) and treated with Argon (14 ml/minute), for 30 minutes. The resulting polymer particles were contacted with 0.19 mmol/g (DS) of alpha-bromoisobutyrate bromide ($BrC(CH_3)_2C(O)Br$).

The reaction mixture was treated with 14 ml/minute of Argon, for 30 minutes and added to a roundbottle reaction flask. It was stirred at 250 rpm, maintained at 0° C. with Argon flow of 14 ml/minute in the suspension for 120 minutes. The mixture was placed on a magnet and the supernatant removed to form a particle suspension.

1.8 g DMSO, 0.19 mmol/g (DS) CuBr and 3.43 mmol/g (DS)N-hydroxysuccinimide methacrylate (NHSMA) were mixed and 0.19 mmol/g (DS) 1,1,4,7,10,10-hexamethyltriethylenetetramine (HMTETA) added seconds before the solution was added to the above particle suspension.

The reaction mixture was stirred at 250 rpm, 70° C., with 14 ml/minute Argon flow. After 100 minutes, 1.3 mmol/g (DS) tert-butylmethacrylate (tBMA), pretreated in Argon (14 nil/minute, 30 minutes) was added to the solution.

Figure 5:
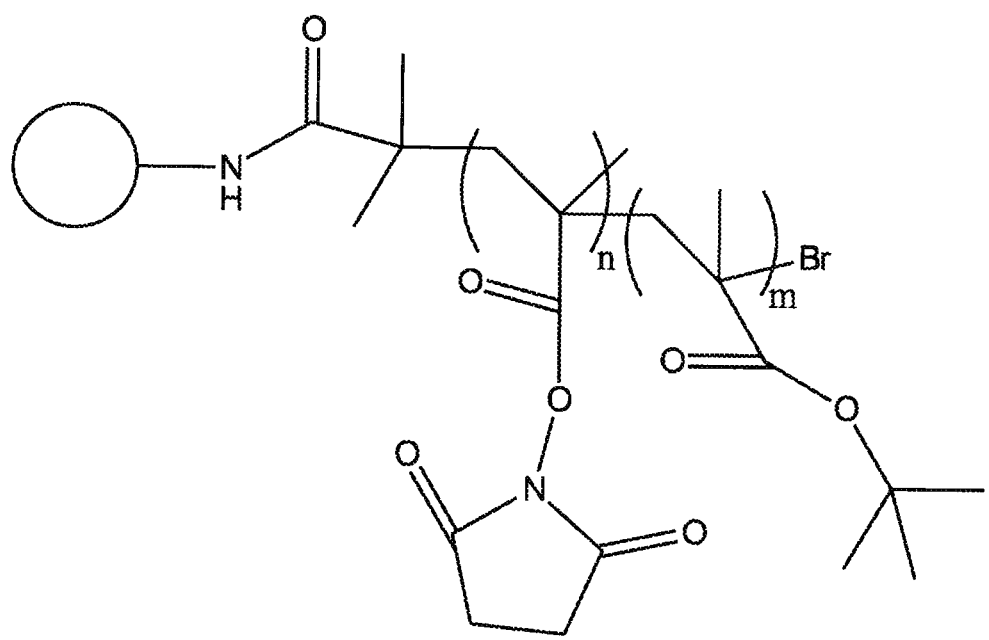
FIG. 5 is the chemical structure of the formed polymer in Example 1.

After 65 minutes, air was allowed into the system and the suspension cooled down to room temperature. The reaction mixture was placed on a magnet and the supernatant removed. The particle suspension was washed 3 times with 10 ml THF/g DS. The formed polymer is shown in FIG. 5.

Where $n=33$; $m=12$; n is the (number average) number of how many NHSMA monomer units theoretically attached to each other to make the polymer; and m is the (number average) number of how many tBMA monomer units theoretically attach to each other to make the polymer.

Example 2: Formation of Hydrophilic and Charged Blocks

Figure 6:
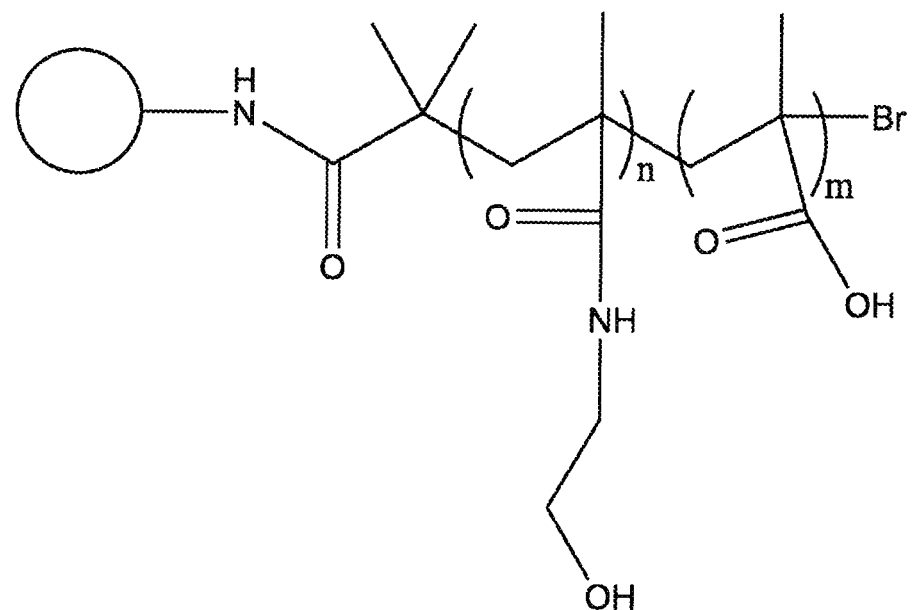
FIG. 6 is the chemical structure of the resulting polymer of Example 2.

The polymer particles of example 1, carrying multiblock polymers where reacted with 12 g/g DS ethanolamine and the suspension heated to 60° C. for 2.5 h. The solution was washed 4 times with 1M NaOH, and stirred at 200 rpm over night. The solution was then washed with 0.01M NaOH. The resulting polymer is shown in FIG. 6.

The carboxylic acid groups in the outer block were measured by a titrating method to determine the amount of carboxylic groups on the particles. Acid groups measured on G133, example 1: 0.011 mmol acid groups/g DS.

Example 3: Preparation of Multi-Block Polymer on a Polymer Particle

Figure 7:
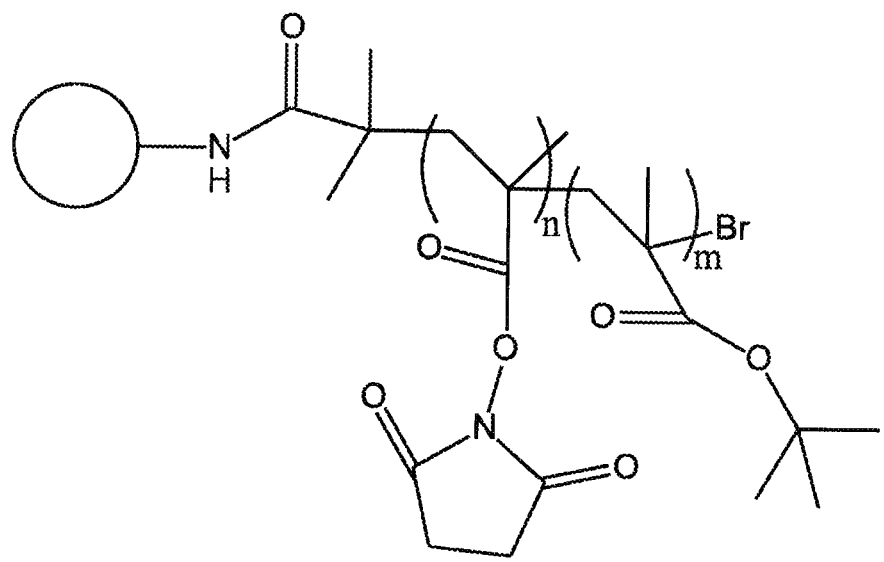
FIG. 7 is the chemical structure of the formed polymer of Example 3.
Figure 8:
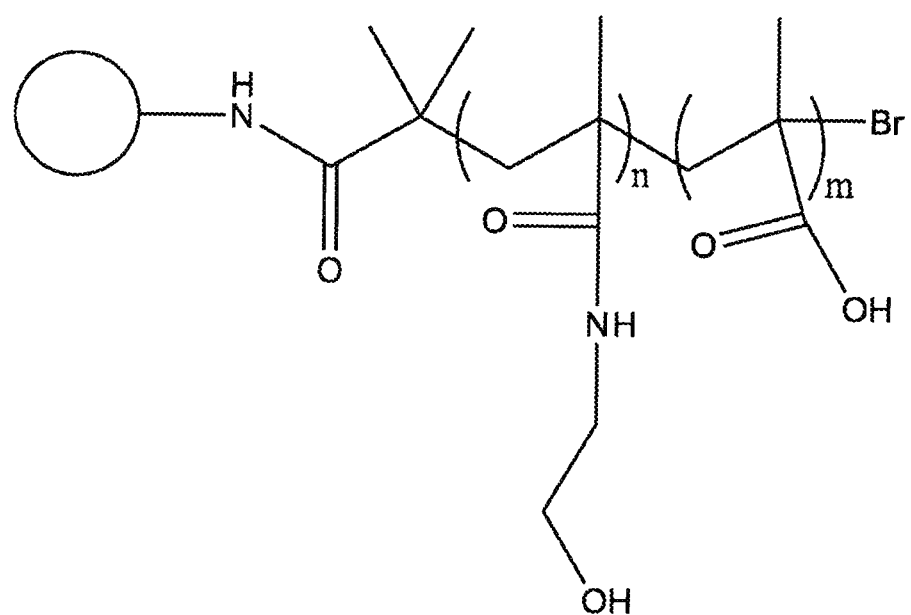
FIG. 8 is the chemical structure of the formed polymer of Example 3.

The procedure of examples 1 and 2 was repeated except that 1.04 mm/g DS NHSMA and 0.67 mmol/g(DS) tertbutylmethacrylate were used. The formed polymers formed are shown in FIG. 7 and FIG. 8.

The acid groups were measured to be: 0.09 mmol acid groups/g DS. In the polymer structures: $n=10$; $m=7$; n is the (number average) number of how many NHSMA monomer units theoretically attach to each other to make the polymer; and m is the (number average) number of how many tBMA monomer units theoretically attach to each other to make the polymer.

Example 4: Preparation of Multi-Block Polymer on a Polymer Particle

The procedure of Example 1 was followed using 0.25 mmol/g (DS) alpha-bromoisobutyrate bromide. 2.45 g DMSO, 0.25 mmol/g (DS) CuBr and 4.58 mmol/g(DS) NHSMA were added to 0.25 nunol/g (DS) HMTETA. After 100 minutes, 1.8 mmol/g(DS) tertbutylmethacrylate was used.

Subsequently, the formed multi-block polymer was reacted with 3.06 g (8.4 mmol/g (DS)) ethanolamine in 36.9 g anhydrous DMF and the suspension heated to 60° C. for 2.5 h. The solution was cooled down and washed 4 times with 1M NaOH and stirred at 200 rpm overnight. The solution was then washed with 0.01M NaOH.

Figure 9:
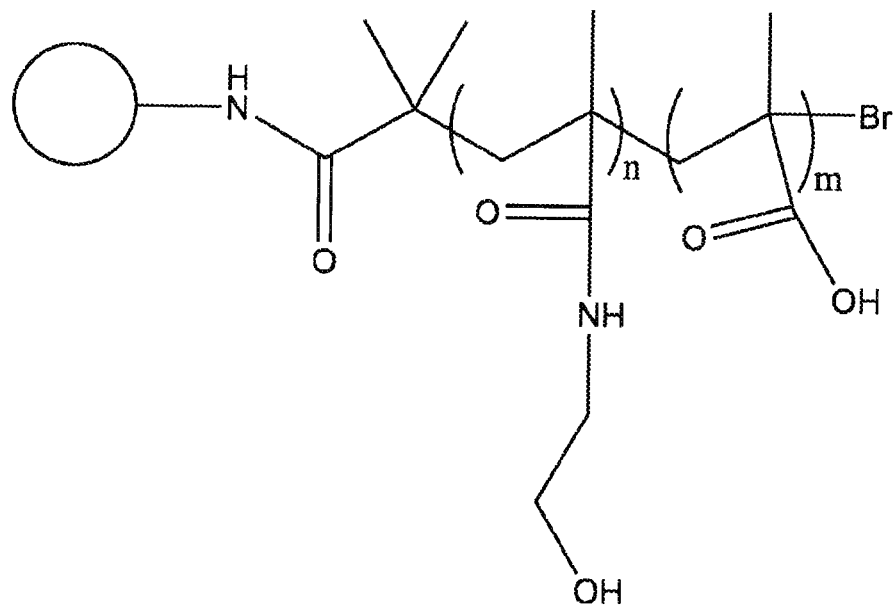
FIG. 9 is the chemical structure for the formed polymer of Example 4.

The formed polymer is shown as FIG. 9.

The carboxylic acid groups in the outer block were measured by a titrating method to determine the amount of carboxylic groups on the particles. The acid groups were measured to be: 0.14 mmol acid groups/g DS. In the polymer structures: $n=33$; $m=12$; n is the (number average) number of how many NHSMA monomer units theoretically attach to each other to make the polymer; and m is the (number average) number of how many tBMA monomer units theoretically attach to each other to make the polymer.

Example 5: Halogenated Functional Particles 5 g (Dry Substance weight, DS) Magnetic Beads (Dynabeads® M-270 amine) were washed with THF (5 times, 15 mug DS each time). The DS weight was adjusted to 30% (the volume of the mix of solvent and beads was reduced by removing the supernatant until a 30 wt % beads in solvent mix was achieved) and treated with Argon (14 ml/minute), for 30 min. The resulting polymer particles were contacted with 0.25 mmol/g (DS) of alpha-bromoisobutyrate bromide.

The reaction mixture was treated with 14 ml/minute of Argon, for 30 minutes and added to a roundbottle reaction flask. It was stirred at 250 rpm, maintained at 0° C. with Argon flow of 14 ml/minute in the suspension for 120 minutes. The mixture was placed on a magnet and the supernatant removed to form particle suspension.

1.8 g DMSO, 0.25 mmol/g (DS) CuBr and 6.00 mmol/g (DS)N-hydroxysuccinimide methacrylate were mixed and 1,1,4,7,10,10-hexamethyltriethylenetetramine (HMTETA) added seconds before the solution was added to the above particle suspension.

The reaction mixture was stirred at 250 rpm, 70° C., with 14 ml/minute Argon flow. After 100 minutes, 2.0 mmol/g (DS) tertbutylmethacrylate, pretreated in Argon (14 ml/minute, 30 minutes) was added to the solution.

After 65 minutes, air was allowed into the system and the suspension cooled down to room temperature. The reaction mixture was placed on a magnet and the supernatant removed. The particle suspension was washed 3 times with 12 ml DMSO/g DS.

Figure 10:
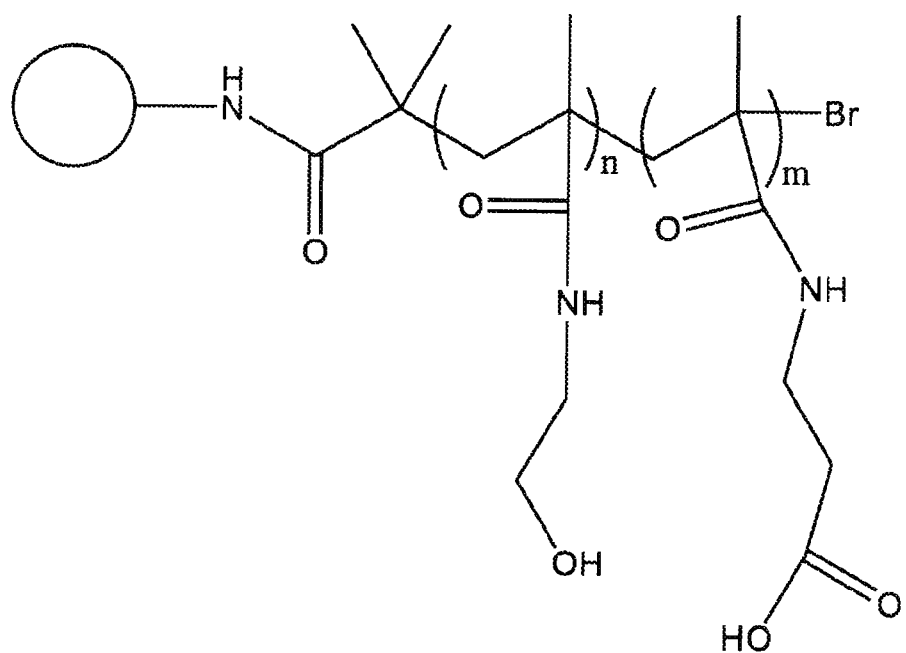
FIG. 10 is the chemical structure for the resulting polymer of Example 5.

Next, hydrophilic and charged blocks were formed. The polymer particles of Example 5, carrying multiblock polymers were reacted with 0.37 g (6.0 mmol (DS)) of ethanolamine mixed with 3.33 g DMSO and treated with Argon (14 ml/minute) for 30 minutes. The mixture was heated for 2.5 hours at 60° C., 250 rpm. 4-aminobutyric acid 0.21 gram, (2.04 mmol/g DS) mixed with 1.9 g DMSO, was added after 2.5 hours, 60° C., 250 rpm and the suspension was cooled down to room temperature. The reaction mixture was placed on magnet and the supernatant was removed. The particles suspension was washed 3 times with 50 ml DMSO. The resulting polymer is shown as FIG. 10.

Where n=24; m=8; n is the (number average) number of how many NHSMA monomer units theoretically attach to each other to make the polymer; and m is the (number average) number of how many tBMA monomer units theoretically attach to each other to make the polymer.

Example 6: Triblock Polymer 5 g (Dry Substance weight, DS) Magnetic Beads (Dynabeads® M-270 amine) were washed with THF (5 times, 15 ml/g DS each time). The DS weight was adjusted to 30% (the volume of the mix of solvent and beads was reduced by removing the supernatant until a 30 wt % heads in solvent mix was achieved) and treated with Argon (14 ml/minute), for 30 minutes. The resulting polymer particles were contacted with 0.25 mmol/g (DS) of alpha-bromoisobutyrate bromide.

The reaction mixture was treated with 14 ml/minute of Argon, for 30 minutes and added to a roundbottle reaction flask. It was stirred at 250 rpm, maintained at 0° C. with Argon flow of 14 ml/minute in the suspension for 120 minutes. The mixture was placed on a magnet and the supernatant removed to form particle suspension.

DMSO with 0.25 mmol/g (DS) CuBr and 1.80 mmol/g (DS) tertbutylmethacrylate, pretreated in Argon (14 ml/minute, 30 minutes) are mixed and 0.25 mmol/g (DS) hexamethyltriethylenetetramine (HMTETA) added seconds before the solution was added to the above particle suspension.

The reaction mixture was stirred for 60 minutes at 130 rpm, 70° C., with 14 ml/minute Argon flow. After 60 minutes, 4.6 mmol/g (DS) NHSMA, pretreated in Argon (14 ml/minute, 30 minutes) was added to the solution. The reaction mixture was stirred for 100 minutes at 130 rpm, 70° C., with 14 ml/minute Argon flow. After 100 minutes, 1.80 mmol/g (DS) tertbutylmethacrylate, pretreated in Argon (14 ml/minute, 30 minutes), was added and the reaction mixture was stirred for 100 minutes at 130 rpm, 70° C., with 14 ml/minute Argon flow.

After 65 minutes, air was allowed into the system and the suspension cooled down to room temperature.

Example 7: Preparation of Polymer in Solution for Grafting to Polymer Particle 5 g (Dry Substance weight, DS) Magnetic Beads (Dynabeads® M-270 amine) were washed with DMSO (5 times, 50 ml/g DS each time) and treated with Argon (14 ml/minute), for 30 minutes. The supernatant was removed and the particles suspension was kept under Argon flow (14 ml/minute).

15 g Argon treated DMSO (14 ml/minute for 30 minutes) was mixed with 0.22 g (0.25 mmol/g DS) CuBr, 0.84 g (4.6 mmol/g (DS))NHSMA, 0.35 g (0.25 mmol/g (DS)) HMTETA, 0,039 g (0.20 mmol/g (DS)) ethyl α-bromoisobutyrate $(CH_3)_2C(Br)CO_2CH_2CH_3)$ and transferred to another 100 ml round bottle by septum, and stirred at 130 rpm, 70° C. with Argon flow of 14 ml/min. After 100 minutes, 0.26 g (1.8 mmol/g (DS)) tBMA was added and the suspension was stirred for another 100 minutes.

The Argon flow was stopped and air allowed in and the solution was cooled to room temperature.

After 30 minutes at room temperature, the solution is added to the particle suspension and heated to 50° C. and stirred for 3 hours with 250 rpm.

Figure 11:
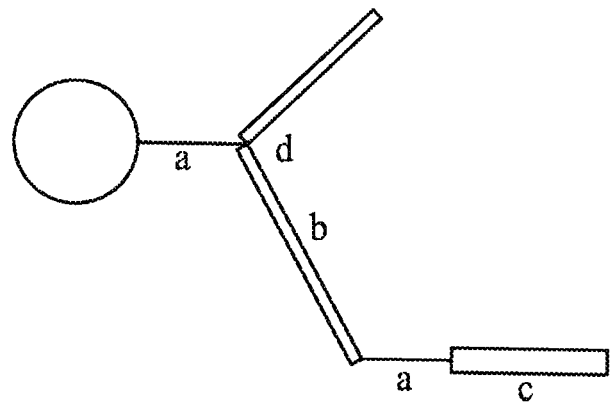
FIG. 11 is the possible structure of the formed polymer of Example 7.

The formed polymer particles carrying co-polymer can further be reacted with functional molecules, for instance ethanolamine and hydrolyzed with 1.0 M NaOH, 200 rpm over night in room temperature. The possible structure of the formed polymer is depicted in FIG. 11.

Poly(NHSMA) post treated with ethanolamine makes a hydrophilic spacer and poly(tBMA) hydrolyses to make acid group functionalities.

Example 8: Preparation of Triblock Polymer in Solution for Grafting to Polymer Particle 5 g (Dry Substance weight, DS) Magnetic Beads (Dynabeads® M-270 amine) were washed with DMSO (5 times, 50 mug DS each time) and treated with Argon (14 ml/minute), for 30 minutes. The supernatant was removed and the particles suspension was kept under Argon flow (14 ml/minute).

15 g Argon treated DMSO (14 ml/minute for 30 minutes) is mixed with 0.22 g (0.25 mmol/g DS) CuBr, 0.26 g (1.8 mmol/g (DS)) tBMA, 0.35 g (0.25 mmol/g (DS)) HMTETA, 0,039 g (0.20 mmol/g (DS)) ethyl α-bromoisobutyrate and transferred to another 100 ml round bottle by septum, and stirred at 130 rpm, 70° C. with Argon flow of 14 ml/min. After 60 min, 0.84 g (4.6 mmol/g (DS)) NHSMA is added to the suspension. After 100 min 0.26 g (1.8 mmol/g (DS)) tBMA is added and stirred for another 60 minutes.

The Argon flow was stopped and air allowed in and the solution is cooled to room temperature.

After 30 minutes at room temperature, the solution was added to the particle suspension and heated to 50° C. and stirred for 3 hours with 250 rpm.

Figure 12:
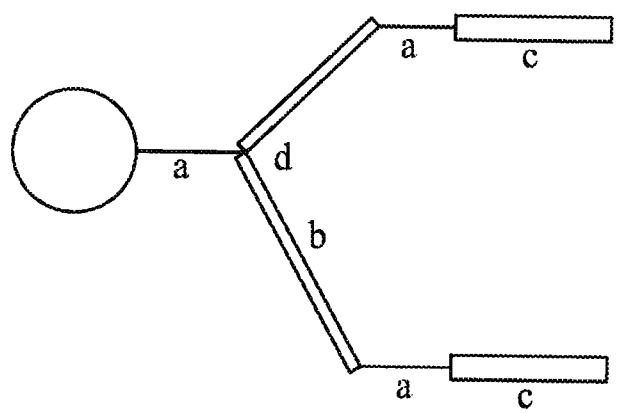
FIG. 12 is the possible structure of the formed polymer of Example 8.

The formed polymer particles carrying multiblock polymers can further be reacted with functional molecules, for instance ethanolamine and hydrolyzed with 1.0 M NaOH, 200 rpm over night in room temperature. The possible structure of the formed polymer is depicted in FIG. 12.

Poly(NHSMA) that is post treated with ethanolamine makes a hydrophilic spacer, and the P(tBMA) hydrolyses to make acid group functionalities.

Example 9: Coupling of Estradiol-6-CMO to Carboxylic Acid Groups on the Heads

A general protocol is as follows.

1.1. Beads (e.g. 5 mg of 2.8 μm from Example 2) are washed with 200 μl MES (50 mM MES pH 5,5) and resuspended in MES (90 μl).

1.2. Add 10 μl of a 10% v/v solution of 2,2'-(ethylenedioxy)diethylamine, Fluka #03739, in 50 mM MES pH 5.0.

1.3. Add EDC (N-Ethyl-N'-(3-dimethylaminopropyl)-carbodiimide hydrochloride] (15 μl at 20 mg/ml in MES).

1.4. Incubate at room temperature for at least three hours.

1.5. Wash with phosphate buffered saline (PBST) (0.1% Tween-20 in PBS) (3×500 μl).

1.6. Resuspend in PBST to 10 mg/ml.

2. Activation of estradiol. [For 20 reactions].

2.1. Estradiol-6-CMO (Fluka #037391 (2 mg) is dissolved in dry DMF (100 μl).

2.2. Add DCC (N, N'-Dicyclohexylcarbodiimide) (2.4 mg in 50 μl dry DMF).

2.3. Add NHS (N-Hydroxysuccinimide) (1.2 mg in 50 μl dry DMF).

2.4. Incubate at room temperature for at least two hours.

3. Coupling.

3.1. Beads (2 mg of 2.8 μm) from step 1.6 are washed in water (200 μl) and three times in dry DMF (200 μl).

3.2. Resuspend in dry DMF (90 μl).

3.3. Add estradiol-NHS (10 μl) from step 2.4.

3.4. Incubate at 37° C. over night.

3.5. Wash in DMF 3×(200 μl), water, and 2×PBST (200 μl).

3.6. Resuspend in PBST to 10 mg/ml.

Example 10: Coupling of Insulin to Carboxylic Acid Groups on the Beads

A general protocol is as follows.

1. 25 mg carboxylic acid beads is washed once with MES buffer (1 ml) and resuspended in MES buffer (500 μl).

2. Add 125 μl EDC (10 mg/ml), mix.

3. Add 125 μl NHS (10 mg/ml), mix.

4. Incubate 15 minutes at 15-20° C.

5. Add 50 μl antigen (2 mg/ml).

6. Incubate 3-4 hours or over night at 15-20° C.

7. Wash 3 times, each with incubation at least 10 minutes, in PBS with 0.1% Tween-20 (1 ml).

8. Resuspend the beads to 10 mg/ml in PBS med 0.01% Tween-20.

Example 11: Determination of Affinity Constant Using a Competitive Assay with Antibody The following is a general assay method.

100 μL ABEI-labeled Antibody (constant amount) in assay buffer (10 mM PBS+0.5% BSA+0.1% Tween) is added to a serum sample (25 μl) supplemented with unlabeled Antibody. Antigen-labeled beads (25 μg of 2.8 μm size or 10 μg of 1.0 μm size) in assay buffer (20 μl) is then added and the mixture is incubated for 30 minutes at ambient temperature.

The beads are separated from the liquid by magnetic separation, the supernatant discarded and the beads washed by the same process in wash buffer (Liaison® wash/system liquid).

The starter reagents are added and the ABEI (aminobutylethyl isoluminol) generated flash chemiluminescence (RLU) is measured for 3 seconds using a photomultiplier tube.

Example 12: Anti-Estradiol Assay to Determine K and Concentration of Active Antigen A competition assay was performed as described above with the estradiol-coated particles, ABEI-labeled anti-estradiol mAb and unlabelled anti-estradiol mAb (0-1600 ng/test) in steroid-free human serum.

The amount of bound antibody is calculated from the measured RLU, and the amount of free antibody in solution is calculated by subtracting the amount bound from the total input antibody amount.

In a chart where 1/Bound Ab on the y-axis is plotted against 1/Free Ab on the x-axis, the concentration of antigen is 1/intercept (x=0) and K=intercept/slope. The insulin assay is carried out analogously. Results are presented in FIGS. 1 to 4. G133 is of the invention.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A method of purifying a target material from a sample, the method comprising:

providing a sample comprising serum or buffer and a target material, wherein the target material is an antibody;

providing a magnetic polymer microparticle, wherein the magnetic polymer microparticle has a surface, wherein the surface is covalently attached to a diblock vinylic polymer spacer arm, wherein the diblock vinylic polymer spacer arm comprises a first block polymer and a second block polymer that is different from the first block polymer, wherein the first-block polymer and the second block polymer consist of methacrylate monomers selected from the group consisting of methacrylate, methyl methacrylate, tert-butyl methacrylate and N-hydroxysuccinimide methacrylate, wherein the first block polymer and the second block polymer has 3 to 50 repeating monomer units, wherein the first block polymer is attached at one end to the surface of the magnetic polymer microparticle, wherein the first block polymer comprises functional groups that are-hydrophilic and uncharged at a pH of between 3 to 12, and the second block polymer comprises pendant functional groups that are charged at a pH of between 3 to 12, wherein at least a portion of the pendant functional groups are carboxylic acid groups, and wherein at least one pendant functional group is covalently attached to a binding partner of the target material, wherein the diblock vinylic polymer spacer arm extends outward from the surface of the magnetic polymer microparticle and distances the binding partner from the surface of the magnetic polymer microparticle, wherein the magnetic polymer microparticle comprises greater than 1% by weight of a magnetic material;

contacting the sample and the magnetic polymer microparticle, thereby binding the target material to the binding partner, wherein the magnetic polymer microparticle remains suspended in the sample and exhibits reduced agglomeration, reduced non-specific binding, and increased binding affinity to the target material compared to a magnetic polymer microparticle in the absence of the diblock vinylic polymer spacer arm; and magnetically separating the magnetic polymer microparticle bound to the target material from the sample, thereby purifying the target material from the sample.

2. The method of claim 1, further comprising detecting the target material after the separating step.

3. The method of claim 1, further comprising isolating the target material from the magnetic polymer microparticle after the separation step.

4. The method of claim 1, wherein the sample is biological fermentation media, cell lysate, prokaryotic cells, eukaryotic cells, suspension of virus particles, tissues, biological fluids, urine, cerebrospinal fluid, blood, lymph fluids, interstitial fluid, cell extracts, mucus, saliva, sputum, stool, or physiological or cell secretions.

5. The method of claim 1, wherein the first block polymer is formed from at least three identical monomer units.

6. The method of claim 1, wherein the second block polymer is formed from at least three identical monomer units.

7. The method of claim 1, wherein the first block polymer and the second block polymer of the diblock vinylic polymer spacer arm has a molecular weight of about 500 Daltons to about 10,000 Daltons.

8. The method of claim 1, wherein the second block polymer further comprises at least one functional group selected from the group consisting of amino, activated carboxylic acid, succinimidyl ester, ester, acid chloride, halide, activated hydroxide, alkoxide, tosylate, brosylate, mesylates, hydroxyl, thiol, activated thiol, carbonate, maleimide, and epoxide.

9. The method of claim 1, wherein the magnetic polymer microparticle comprises magnetic particles.

10. The method of claim 1, wherein the magnetic polymer microparticle further comprises superparamagnetic crystals.

11. The method of claim 1, wherein the magnetic polymer microparticle is porous.

12. The method of claim 1, wherein the magnetic polymer microparticle has a diameter of about 0.1 µm to about 500 µm.

13. The method of claim 1, wherein the diblock vinylic polymer spacer arm comprises a linear polymer.

14. The method of claim 1, wherein the first block polymer has a first molecular weight, and the second block polymer has a second molecular weight, wherein a ratio of the first molecular weight to the second molecular weight is 1:10 to 10:1.

15. The method of claim 1, wherein the first block polymer and the second block polymer has 10 to 50 repeating monomer units.

\* \* \* \* \*